(12) United States Patent
Lapine

(10) Patent No.: US 9,332,882 B2
(45) Date of Patent: May 10, 2016

(54) SHAPE MEMORY HANDLES AND INSULATORS

(71) Applicant: Hudson Home Group LLC, Boonton, NJ (US)

(72) Inventor: Rick Lapine, Irvington, NY (US)

(73) Assignee: Hudson Home Group LLC, Boonton, NJ (US)

( * ) Notice: Subject to any disclaimer, the term of this patent is extended or adjusted under 35 U.S.C. 154(b) by 0 days.

(21) Appl. No.: 14/518,097

(22) Filed: Oct. 20, 2014

(65) Prior Publication Data

US 2015/0034654 A1 Feb. 5, 2015

Related U.S. Application Data

(63) Continuation of application No. 13/465,862, filed on May 7, 2012, now Pat. No. 8,887,948.

(60) Provisional application No. 61/609,141, filed on Mar. 9, 2012.

(51) Int. Cl.
*A47J 45/08* (2006.01)
*A47J 45/06* (2006.01)
*A47J 45/00* (2006.01)
(Continued)

(52) U.S. Cl.
CPC ............. *A47J 45/08* (2013.01); *A47J 27/002* (2013.01); *A47J 36/00* (2013.01); *A47J 45/00* (2013.01); *A47J 45/06* (2013.01); *B29C 45/1671* (2013.01); *B29C 45/1676* (2013.01); *B29C 69/00* (2013.01); *B32B 1/08* (2013.01); *B32B 7/02* (2013.01); *B32B 25/08* (2013.01); *B32B 25/20* (2013.01); *B32B 27/08* (2013.01); *B32B 27/302* (2013.01); *B32B 27/308* (2013.01); *B32B 27/34* (2013.01); *B32B 37/153* (2013.01); *B32B 37/24* (2013.01); *B29C 45/14* (2013.01); *B32B 2274/00* (2013.01); *B32B 2307/304* (2013.01); *B32B 2307/536* (2013.01); *B32B 2307/732* (2013.01); *Y10T 16/44* (2015.01); *Y10T 29/49826* (2015.01); *Y10T 156/10* (2015.01); *Y10T 428/24983* (2015.01); *Y10T 428/31663* (2015.04)

(58) Field of Classification Search
CPC .......... A47J 45/08; A47J 45/06; A47J 27/002; B29C 45/1676
See application file for complete search history.

(56) References Cited

U.S. PATENT DOCUMENTS 1,473,335 A * 11/1923 Chandler ................... 220/759
1,809,060 A * 6/1931 Nelson et al. .............. 220/753
(Continued)

*Primary Examiner* — Jeffrey Allen
*Assistant Examiner* — Jennifer Castriotta
(74) *Attorney, Agent, or Firm* — Holland & Knight LLP

(57) ABSTRACT

Shape memory insulators comprising a first layer of core material, such as polymeric insulative material, and a second, shape memory layer of elastomeric material, for attachment to objects. The shape memory layer may comprise silicone rubber, silicone gum, silicon crepe, and/or silicone gel, for example. The shape memory insulator may be part of a handle for an object, such as a pot or pan, for example, or other objects and devices requiring continuous and/or repetitive manual operation. The shape memory polymeric material may conform to the shape of the user's hand when the handle is gripped by a user's hand. When the grip is released, the shape memory material returns to its original shape. The shape memory insulators provide insulation as well as improving comfort and/or control over the engagement and use of objects, while decreasing arm and hand wear and/or strain of those using the objects.

12 Claims, 5 Drawing Sheets

(51) Int. Cl.

| | | |
|---|---|---|
| *B32B 27/08* | (2006.01) | |
| *B29C 69/00* | (2006.01) | |
| *A47J 36/00* | (2006.01) | |
| *B29C 45/16* | (2006.01) | |
| *B32B 25/08* | (2006.01) | |
| *B32B 25/20* | (2006.01) | |
| *B32B 27/30* | (2006.01) | |
| *B32B 27/34* | (2006.01) | |
| *B32B 1/08* | (2006.01) | |
| *A47J 27/00* | (2006.01) | |
| *B32B 7/02* | (2006.01) | |
| *B32B 37/15* | (2006.01) | |
| *B32B 37/24* | (2006.01) | |
| *B29C 45/14* | (2006.01) | |

(56) References Cited

U.S. PATENT DOCUMENTS

| | | | | |
|---|---|---|---|---|
| 1,860,596 A | * | 5/1932 | Reinold | 220/753 |
| 1,965,354 A | * | 7/1934 | Patock | 16/421 |
| 1,976,411 A | * | 10/1934 | Olson | 220/753 |
| 2,140,157 A | * | 12/1938 | Huffman | 38/90 |
| RE22,749 E | * | 4/1946 | Mason | 220/759 |
| 2,619,672 A | * | 12/1952 | Glaser et al. | 16/421 |
| 3,656,594 A | * | 4/1972 | Marks et al. | 16/408 |
| 3,812,997 A | * | 5/1974 | McNally | 220/529 |
| 4,197,611 A | * | 4/1980 | Bell et al. | 220/753 |
| 5,083,825 A | * | 1/1992 | Bystrom et al. | 294/171 |
| 5,926,912 A | * | 7/1999 | Claphan | 16/411 |
| 5,944,617 A | * | 8/1999 | Falone et al. | 473/300 |
| 6,006,403 A | * | 12/1999 | Battiato | 16/421 |
| 6,685,047 B1 | * | 2/2004 | Mott et al. | 220/753 |
| 6,863,629 B2 | * | 3/2005 | Falone et al. | 473/520 |
| 7,025,690 B2 | * | 4/2006 | Nam | 473/300 |
| 7,409,747 B2 | * | 8/2008 | Chen | 16/430 |
| 7,490,732 B2 | * | 2/2009 | Wasserman et al. | 220/753 |
| 7,789,768 B2 | * | 9/2010 | Tremulis et al. | 473/300 |
| 7,996,961 B2 | * | 8/2011 | Blauer et al. | 16/431 |
| 8,132,689 B2 | * | 3/2012 | Pasquini | 220/755 |
| 8,418,322 B2 | * | 4/2013 | Ng et al. | 16/431 |
| 8,556,115 B2 | * | 10/2013 | Bellerose et al. | 220/755 |
| 2003/0029002 A1 | * | 2/2003 | Willat | 16/430 |
| 2004/0060936 A1 | * | 4/2004 | Logiudice | 220/254.1 |
| 2004/0205937 A1 | * | 10/2004 | Blauer et al. | 16/431 |
| 2006/0118444 A1 | | 6/2006 | Bellerose et al. | |
| 2007/0074374 A1 | * | 4/2007 | Chen | 16/431 |
| 2008/0034554 A1 | * | 2/2008 | Ko | 16/430 |
| 2008/0092338 A1 | * | 4/2008 | Wu | 16/430 |
| 2008/0290104 A1 | * | 11/2008 | Ng et al. | 220/753 |

* cited by examiner

SHAPE MEMORY HANDLES AND INSULATORS

RELATED APPLICATION

The present application is a continuation of co-pending U.S. patent application Ser. No. 13/465,862, filed on May 7, 2012 which claims the benefit of U.S. Provisional Patent Application No. 61/609,141, filed on Mar. 9, 2012, which are both hereby incorporated by reference.

FIELD OF THE INVENTION

Shape memory handles and insulators comprising one or more layers of shape memory elastomeric materials, such as silicone based elastomeric materials, and objects including such handles.

BACKGROUND OF THE INVENTION

The use of kitchen products, such as cookware, kitchen tools, such as utensils, and kitchen gadgets, such as can openers and pizza wheels, often involve repetitive and/or forceful motions that can strain a user's hand. Cookware, such as pots and pans, are often heavy, which can also strain a user's hand. The handles of cookware, kitchen tools, and kitchen gadgets can also get hot during use.

U.S. Pat. No. 8,132,689 describes a cookware handle consisting of a rigid structure attached to the cookware and a flexible grip that surrounds the rigid structure. At least one hollow cavity is positioned directly underneath the flexible grip, facing a hand support area. The flexible grip is compressed into the cavity when the cookware handle is grasped by the user's hand. The flexible grip is made of elastomers, foam, or heat-resistant silicone material. The grip is made by injection molding. After injection molding, the flexible grip is slid over the shaft of the rigid structure and glued into place.

U.S. Pat. No. 8,104,163 describes a cookware handle said to have a soft, resilient, thermally insulating grip portion of a soft elastomer, preferably thermoset silicone rubber. The grip portion surrounds a metal shell having a hollow interior. A ribbon or strap extends from the metal shell, to reinforce and add resilience to the soft elastomer.

U.S. Pat. No. 7,996,961 B2 describes a pliable handle for umbrellas, canes, walking sticks, sports equipment, tools, garden equipment, kitchen tools, such as a knife, pot, pan, or can opener, cleaning equipment, writing instruments, and beauty equipment. The handle includes a tubular core member. An annular flange at or near at least one end of the tubular core member partially defines a gel-containing portion along the core member. A deformable outer sheath is disposed about the tubular core member and a gel is disposed between the tubular core member and the outer sheath. At least one end of the tubular core member is sealed. A gel-directing through bore is provided through the core member for passage of gel when the handle is gripped. A force applied to the outer sheath causes load movement of the gel. The deformable outer sheath and gel together have a memory effect causing a deformation to remain for a period of time before the sheath returns substantially to its original shape. The core member and sealer may be PVC, ABS, PE, and PP plastic. The gel may be silicone. The outer sheath may be vulcanized silicone.

U.S. Pat. No. 6,725,505 describes a deformable grip responsive to user hand and/or fingertip pressure for manually grasped implements such as a cooking vessel. A resilient member defines at least one internal cavity filled with a flowable resilient filler material. The filler material comprises a plurality of resilient balls movable within said at least one cavity in response to tactile pressure. The resilient balls may be polyurethane foam balls coated with a liquid-based silicon lubricant. The resilient balls are injected through an injection port in the resilient member, into the cavity.

SUMMARY OF THE INVENTION

In accordance with an embodiment of the invention, a handle is disclosed comprising a first layer of core material and a second layer of elastomeric material bonded to at least a portion of the first layer. The elastomeric material has shape memory such that, when a force is applied on the elastomeric material by a user's hand, such as by gripping the elastomeric material and the handle, the elastomeric material conforms to the user's hand. When the force is removed, the elastomeric material returns to its shape prior to the force being applied. The handle further comprises an elongated member secured to the first layer. The elongated member is configured to be attached to an object.

The first, layer of core material may be an insulative material, such as an insulative polymeric material. The insulative polymeric material may comprise acrylonitrile butadiene styrene ("ABS") resin, nylon, or thermoplastic rubber, for example. The second layer of elastomeric material may comprise a silicon based elastomer, such as silicone rubber, silicone gum, silicone crepe, or silicone gel, for example. The second layer of elastomeric material may be overbonded to the layer of polymeric insulative material. The elastomeric material may completely surround a circumferential portion of the first, layer of insulative material.

The second layer of elastomeric material may comprise a first, inner layer of elastomeric material adjacent to the first layer and a second, outer layer of elastomeric material adjacent to the first, inner layer. The outer layer may be bonded to the first layer of core material and have a hardness greater than a hardness of the inner layer, to contain the first, inner layer of elastomeric material between the first layer of core material and the second, outer layer of elastomeric material. The first, inner layer and/or the second, outer layer have shape memory.

The first layer of insulative material may be hollow and a hollow insert may be provided within the hollow first layer to secure the elongated member to the first layer. The hollow insert may be pressure fit within the first layer and the elongated member may be pressure fit within the hollow insert. for example. The elongated member may have first and second ends and the first, or the first and second ends may be configured to be attached to an object.

In accordance with another embodiment of the invention, a method of making a handle is disclosed comprising forming a first, insulative layer, bonding a second layer of elastomeric material having shape memory to at least a portion of the first insulative layer, and securing an elongated member having an end configured to be attached to an object, to the first, insulative layer. The second layer of elastomeric material may be bonded to the first, insulative layer by a chemical and/or mechanical bond.

The elastomeric material may comprise a silicone based elastomeric material and the method may comprise bonding the silicone based elastomeric material to the first, insulative layer by overmolding the silicone based elastomeric material to the first, insulative layer. The silicone based elastomeric material may comprise silicone rubber, silicone gum, silicone crepe, or silicone gel, for example. The first, insulative layer may be formed by extrusion. The first insulative layer may comprise acrylonitrile butadiene styrene, nylon, or thermoplastic rubber, for example.

The second layer of elastomeric material may comprise a first, inner layer of elastomeric material and a second, outer layer of elastomeric material, where the outer layer has a hardness greater than a hardness of the inner layer. The method may then comprise overbonding the first inner layer to the first, insulative layer and overbonding the second, outer layer to the first, insulative layer.

In accordance with another embodiment of the invention, cookware is disclosed comprising a body portion to contain or support an item to be heated, and a handle. The handle comprises a first inner layer of insulative materials and a second outer layer of elastomeric material bonded to at least a portion of the first inner layer. The elastomeric material has shape memory such that, when a force is applied on the second layer by a user's hand, such as when the user grips the handle, the elastomeric material conforms to the user's hand. When the force is removed, the polymeric material returns to its shape prior to application of the force. An elongated member is secured to the first inner layer. The body portion may be a pot or a pan, for example. As above, the elastomeric layer may comprise a silicone based elastomeric material. Also as above, the elastomeric layer may comprise a first, inner layer of a silicone based elastomeric material and a second, outer layer of a silicone based elastomeric material having a hardness greater than a hardness of the inner material.

In accordance with another embodiment of the invention, a shape memory insulator is disclosed comprising a first layer of insulative material and a second layer of elastomeric material having shape memory bonded to at least a portion of the insulative layer. The first insulative layer may comprise acrylonitrile butadiene styrene resin, nylon, or thermoplastic rubber. The second layer of elastomeric material may comprise a silicone based elastomeric material, such as silicone rubber, silicone gum, silicone crepe, or silicone gel. As above, the elastomeric layer may comprise a silicone based elastomeric material. Also as above, the elastomeric layer may comprise a first, inner layer of silicone based elastomeric material and a second, outer layer of silicone based elastomeric material having a hardness greater than a hardness of the inner material. The first layer of insulative material may be configured to be attached to an object.

DETAILED DESCRIPTION OF A PREFERRED EMBODIMENT

Figure 1:
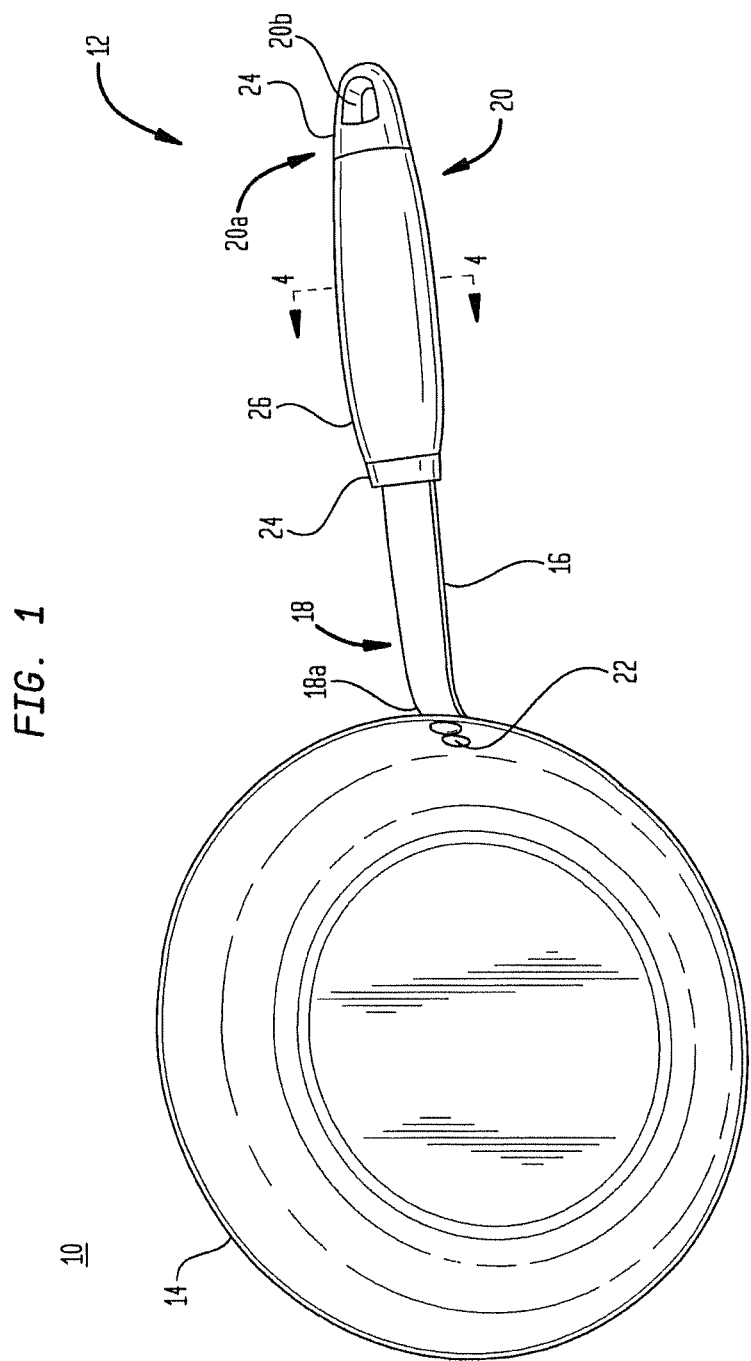
FIG. 1 is a top view of a pan including a handle in accordance with an embodiment of the invention.

In one embodiment, a handle comprises a core material surrounded by one or more layers of elastomeric, shape memory material, such as silicon based elastomeric materials. In another embodiment, shape memory insulators are provided comprising a first layer of insulative material, such as acrylonitrile butadiene styrene ("ABS") resin, nylon, or thermoplastic rubber, for example, and a second, shape memory layer of elastomeric material, for attachment to objects. The elastomeric shape memory layer may be a silicone based material, such as silicone rubber, silicone gum, silicone crepe, or silicone gel, for example. In one embodiment, the shape memory insulator is part of a handle for an object, such as a pot or pan, for example. The shape memory elastomeric material conforms to the shape of the user's hand when a force is applied to the material, such as when the handle is gripped by a user's hand. When the force is removed when the grip is released, for example, the elastomeric material returns to its shape prior to the force being applied. The combination of layers provides insulation as well as improving comfort and/or control over the engagement and use of objects, while decreasing arm and hand wear and/or strain of those using the objects.

The object may be any type of cookware, such as any type of pot and pan, and the shape memory insulator is used on handles of the cookware. In another example, the object is a kitchen tool, such as a fork, a spoon, a knife, a spatula, a ladle and a turner, for example, and the shape memory insulators may be part of the gripping portion of the tool.

The shape memory insulators of the present invention may also be used on mechanical devices, such as on handles or gripping portions of kitchen gadgets including can openers, cheese graters, garlic presses, pizza wheels and pizza cutters, for example. They can also be used as handles or gripping portions of electromechanical devices objects, such as coffee or tea pots, coffee makers, hot pots, hot plates, curling irons, hair dryers, and other devices that generate heat. Shape memory insulators of embodiments of the present invention may also be used as handles or gripping portions of objects and mechanical and electromechanical devices that require repetitive and/or continuous manual engagement or operation, such as hair brushes, umbrellas, gardening tools, electric tools, such as hand held drills, and non-electric tools, such as screw drivers and hammers, for example. The handle may be used to insulate cold objects and devices, as well. If insulation is not required, or only low insulation is required, the core need not comprise a highly insulative material (although that is an option). The core material may comprise stainless steel, for example.

In accordance with another embodiment, the shape memory insulator is attached to a surface to provide insulation and/or comfort during use. For example, the shape memory insulator may be attached to surfaces of electronic devices for heat insulation, as well as to improve the comfort when the device is held or rests on a surface.

FIG. 1 is a top view of an example of cookware, here a cooking pan 10, including a handle 12 in accordance with an embodiment of the invention. The pan 10 includes a body portion 14 that receives food or liquids to be heated. The handle 12 is an elongated member 16 having a first portion 18 and a second, grip portion 20. In this example, the first portion 18 of the handle 12 has a first end 18a attached to a side of the body portion 14 by rivets 22, as is known in the art. Two rivets 22 may be used, for example, as shown in FIG. 1. Other attachment mechanisms and configurations may be used, instead. The first end 18a may be configured to be attached to the body portion 14 by the desired mechanism by providing suitable holes (not shown) in the first end and curving the first end, for example, as necessary, for example. Other configurations known in the art for attachment of a handle to an object may be used, as well. The elongated member 16 may be a metal or metal alloy, such as steel, for example. The elongated member may also comprise other substantially non-flammable materials, such as hard plastics, or ceramics, as is known in the art.

In this embodiment the second, grip portion 20 of the handle 12 includes a first, insulative layer 24 of insulating material. The insulative material 24 may comprise polymeric material, such as acrylonitrile butadiene styrene ("ABS") resin, nylon, or thermoplastic rubber, for example. Other insulative materials may be used, including stainless steel. In this example the insulative layer 24 is a hollow sleeve completely surrounding the elongated member 16. The insulative layer 24 may partially surround the elongated member, instead. The second, grip portion 20 may have a second end 20a having a hole 20b for hanging of the pan 10. In this example, the hole 20b is formed in the insulative layer 24.

A second layer 26 of elastomeric, shape memory material is provided over at least a portion of the insulative layer 24. The elastomeric shape memory layer 26 is a soft, malleable and has shape memory so that it conforms to a user's hand while the user is gripping or otherwise applying a force to the grip portion 20 of handle 12, and returns to its original shape when the user's grip or force is removed. The elastomeric shape memory layer 26 may comprise one or more silicone based materials, for example. Appropriate silicone based materials include silicone rubber, silicone gum, silicone crepe, or silicone gel, for example. Other elastomeric materials, such as acrylic gel, urethane gels, and other soft elastomeric materials that are deformable and have shape memory may be used, instead.

The elastomeric shape memory layer 26 is bonded to and supported by the insulative layer 24. The bonding may be direct chemical and/or mechanical bonding between the first and second layers 24, 26, or the bonding may be provided by intermediate layers between the polymeric shape memory layer 26 and the insulative layer 24. The elastomeric shape memory layer 26 may comprise a single layer of material or multiple layers of material. The insulative layer 24 may have a hardness greater than the hardness of the elastomeric shape memory layer 26.

Figure 2:
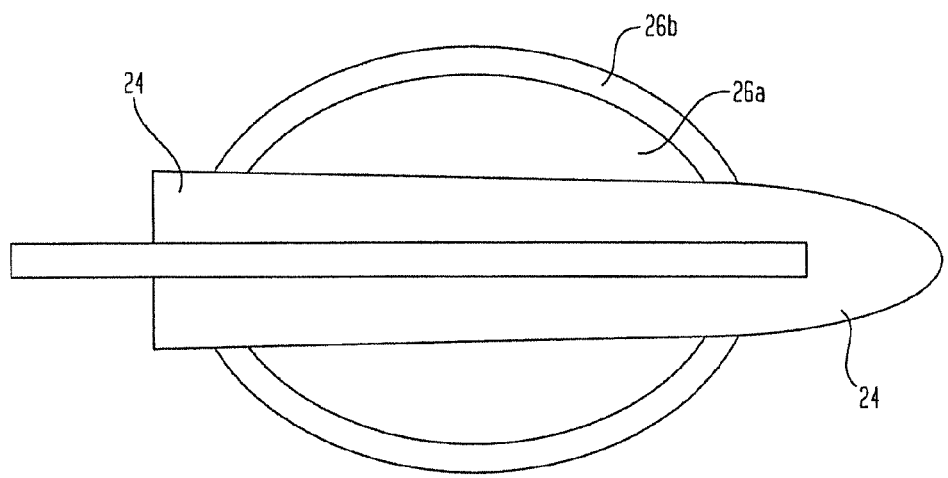
FIG. 2 is a side, schematic cross-sectional view of an example of the grip portion of the handle of FIG. 1.

In this example, the second, elastomeric shape memory layer 26 comprises a first, inner layer 26a of a first elastomeric material and a second, outer layer 26b of a second elastomeric material having a greater hardness than the first layer, as shown in the schematic, side cross-sectional view of the handle 12 in FIG. 2. The outer layer 26b surrounds the inner layer 26a so that the inner, softer layer 26a is contained between the outer layer 26b and the first, insulative layer 24. The widest portion of the inner layer 26a may be thicker than the outer layer 26b, the outer layer may be thicker than the inner layer, or they may have the same thickness. The outer layer 26b also protects the inner layer 26a from the environment and from excessive stress that could damage the inner layer. Either or both of the inner layer 26a and the outer layer 26b may be shape memory materials so that together, the inner layer 26a and the outer layer 26b exhibit shape memory.

In one example, the inner layer 26a is bonded to the first, insulative layer 24 and the second, outer layer 26b is bonded to both the inner layer 26a and to the first, insulative layer 24. Alternatively, only the outer layer 26b is bonded to the first, insulative layer 24, and may or may not be bonded to the inner layer 26a. In either case the bonding may be chemical and/or mechanical bonding.

The inner layer 26a and the outer layer 26b may be any elastomeric material exhibiting shape memory characteristics in the intended environment, under the expected forces, such as when a handle connected to a pot or pan is grasped by a user, as long as the material of the outer layer is harder than the material of the inner layer. The inner layer 26a and the outer layer 26b may each be silicone based elastomeric materials, such as silicone rubber, silicone gum, silicon crepe, or silicone gel, for example, as long as the outer layer is harder than the inner layer.

Figure 3:
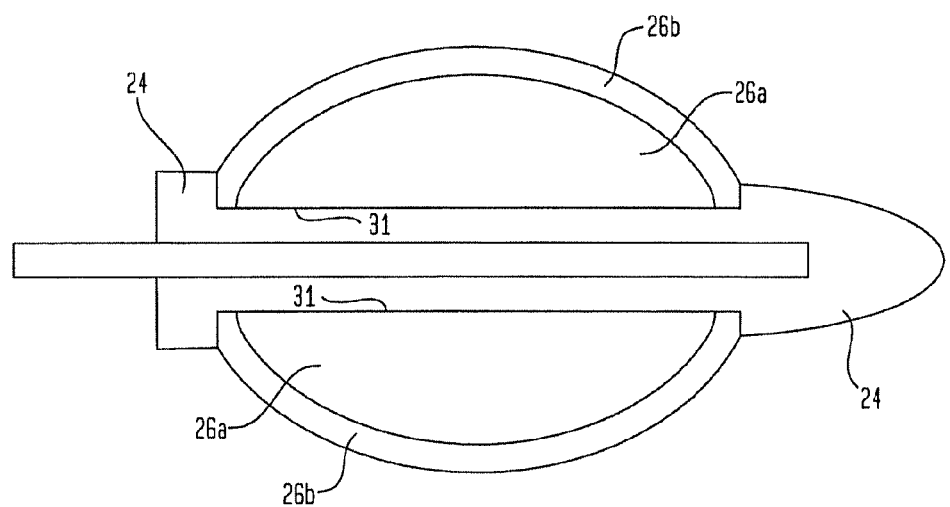
FIG. 3 is another side, schematic, cross-sectional view of another example of the grip portion of the handle of FIG. 1.

FIG. 3 is a side, schematic cross-sectional view of the handle 12 in the alternative configuration, where the first, insulative layer 24 includes a recess 31. In this configuration, the inner layer 26a is within the recess 31 and the outer layer 26b is at least partially within the recess. In another example (not shown), the inner layer 26a may fill the recess 31 and the outer layer 26b may be bonded to the first, insulative layer 24 outside of the recess.

The inner layer 26a may be a silicone crepe material, such as TY971-60, available from Wynco Tinyo Silicone Co., Ltd. Qingyun China, for example. According to the manufacturer, TY971-60 is a transparent, fumed filler, silicone rubber with a Shore A hardness of 60, a tensile strength (MPa) of 9.0, an elongation at break (%) of 450, a tear strength (N/mm) of 30.0, and a specific gravity of 1.0-1.5. The inner layer 26a may also be a methylvinyl silicone gum available from Nan Tai Hardware and Chemical Company, Ltd., Hong Kong, for example.

The second, outer layer 26a may be a silicone rubber, for example having a hardness greater than the hardness of the first, inner layer 26a. A suitable silicone rubber may be a transparent silicone rubber comprising 30-60% by weight methoxypolydimethylsiloxane, 10-30% by weight treated fumed silica, and 10%-15% by weight polydimethylsiloxane having a specific gravity of 1.06, for example, according to a Material Safety Data Sheet for the product.

The inner insulative layer 24 may be a Toyolac ABS resin, for example, available from Toray Plastics (Malaysia) Sdn. Bhd., which is said to have a specific gravity of 1.01-1.06 (water=1), by the manufacturer. Toyolac does not have a sharp melting point, but is said to soften gradually over a broad temperature range between 100-150° C. Toyolac comes in grades 100, 250, 300, 600, and 700. A suitable grade may be selected by one skilled in the art based on the thickness of the core.

The elastomeric shape memory layer 26, whether of a single layer of elastomeric material or two or more layers of elastomeric material, conforms, at least in part, to the user's hand, regardless of the size of the user's hand, improving the control and comfort of the grip, and facilitating use of the pan or other such object. The shape memory layer 26 reduces hand wear and strain while being gripped by a user during use. It may be useful for those with arthritis, carpal tunnel syndrome, and other hand problems, for example. The elastomeric shape memory layer 26 may also provide further heat insulation.

The elastomeric material or materials of the elastomeric shape memory layer 26 may be translucent or colored, as can the first, insulative layer 24. If the elastomeric shape memory layer 26 is translucent, the color of the layer 26 will appear to be the color of the underlying layer 24 of ABS resin or other inner insulative material.

To manufacture the handle 12 as shown in FIG. 2, comprising an ABS resin core 24 and inner and outer layers 26a, 26b of the silicone based elastomeric materials described above, for example, ABS resin is extruded to form a hollow core 24. The core 24 is cooled and inserted into a mold. The first layer 26a of elastomeric material is bonded to the core 24 by overmolding, by injecting the material of the second inner layer 26a into the mold. After cooling, the second layer of elastomeric material 26b is bonded to the inner layer 26a and to the core 24 by overmolding by injecting the second elastomeric material into the mold. The core 24, the inner layer 26a, and the outer layer 26b may also be injection molded in a multistep injection molding process. If only a single layer 26 of elastomeric shape memory material is to be provide, it can be overmolded over the core 24, in a similar manner. Intermediate layers may be provided between the core 24 and the layer 26 or 26a, and between the layer 26a and the layer 26b, as well. The inner layer 26a may be bonded to the core 24 and the outer layer 26b may be bonded to the inner layer by chemical and/or mechanical bonding. Other suitable process may be used, and may depend on the materials of the core 24, and inner and outer layers 26a, 26b, as is known in the art.

After cooling, a hollow insert 28 of stainless steel, for example, is inserted into the hollow core 24. (See FIG. 4). The insert 28 has an opening 30 having the shape of the elongated member 16. The second end of the elongated member 16 is then inserted into the hollow insert 28. The parts are suitably dimensioned for a tight pressure fit. Other attachment mechanisms may be used to attach the insert 28 to the core 24 and/or to connect the insert to the elongated member 16, such as glue, screws, or rivets, for example, in addition to or instead of the pressure fit. The handle 12 may then be riveted or otherwise attached to the body portion 14.

Figure 4:
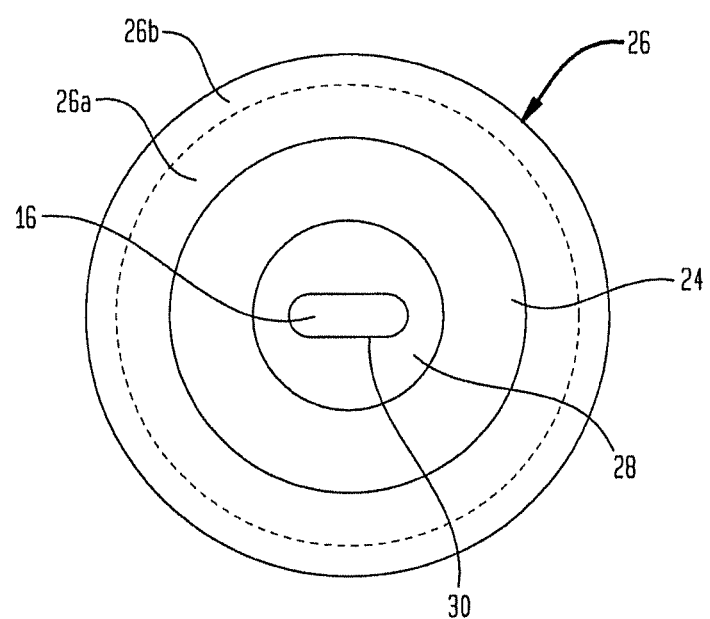
FIG. 4 is a schematic, cross-sectional view of an example of the grip portion of the handle through line 2-2 of FIG. 1.

FIG. 4 is a schematic, cross-sectional view of the second, grip portion 20 of the handle 12, through line 4-4 of FIG. 1. FIG. 4 shows elastomeric shape memory layer 26 comprising an inner layer 26a and an outer layer 26b, the hollow core 24, the insert 28, and the elongated member 16. The inner layer 26a and the outer layer 26b completely surround at least a circumferential portion of the core 24, although that is not required.

The handle 12 may be attached to other types of cookware, such as pots, for example. The handle 12 may also be provided on serving trays. Handles and gripping portions for kitchen tools, such as spoons, knives, forks, spatulas, ladles, and turners, and kitchen gadgets, such as can openers, cheese graters, garlic presses, pizza wheels, and pizza cutters, may be similarly formed. The handles of other kitchen ware items that are heated or generate heat, or are cold, or are gripped, such as a coffee or tea pot, hot pot, or coffee maker, for example, may incorporate handles and shape memory insulators in accordance with embodiments of the invention. The shape memory insulators of the invention may also be used on or as handles or gripping portions on other heat generating devices, such as irons, curling irons, and hair dryers, for example. It may also be used on objects and devices requiring continuous and/or repetitive manual engagement or operations, such as hair brushes, umbrellas, garden tools, electric tools, such as hand drills, and non-electric tools, such as screw drivers and hammers, for example.

Figure 5:
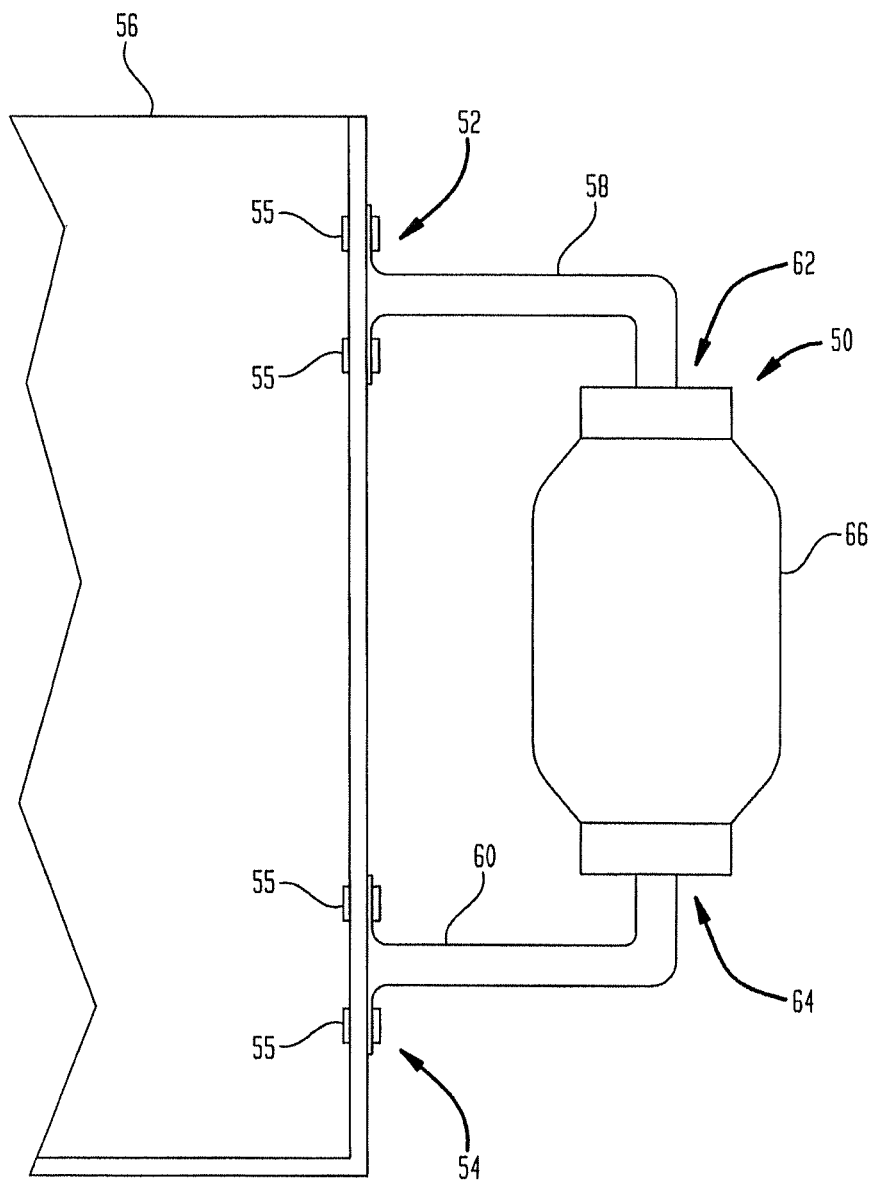
FIG. 5 is a top view of a handle connected to an object at both ends.

In some objects, such as serving platters and trays, for example, the handle is connected to the body at two ends. In that case, the elongated member may be configured to be attached to the object by being configured to be attached to plates, at two ends. FIG. 5 is a view of a handle 50 having two ends 52, 54 configured for attachment to an object. The handle 50 may be appropriate for use with a flat cooking pan or serving trays, for example. A portion of a flat cooking pan 56 is shown. It may be used with other objects in which the handle 50 needs to be attached at two ends due to the weight or configuration of the object, for example. The handle 50 may comprise two elongated members 58, 60 each including a respective end 52, 54, configured for attachment to an object, device, or structure by welding, riveting, etc. In this example, rivets 55 are shown. The other ends 62, 64 of the two elongated members 56, 58 are inserted into a grip portion 66 configured as described above. The ends 62, 64 may be secured to the grip portion 64 by a tight fit, and/or other mechanisms as described above. The grip portion 66 can be formed on or secured to a single elongated member having two ends configured to be attached to an object, device, or structure, as well.

Figure 6:
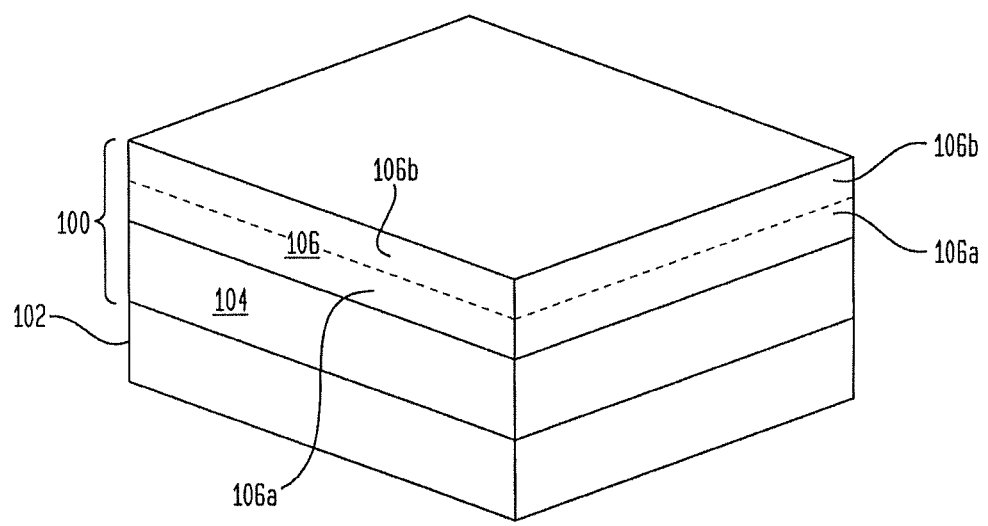
FIG. 6 is a perspective view of a shape memory insulator attached to an object, in accordance with another embodiment of the invention.

FIG. 6 is a perspective view of a shape memory insulator 100 in accordance with another embodiment of the invention, connected to an object 102. The shape memory insulator 100 comprises a layer of insulative material 104, such as ABS resin, and a layer of elastomeric, shape memory material 106, such as a silicone rubber, silicone gum, silicone crepe, or silicone gel or the other elastomeric materials described above. The elastomeric, shape memory layer 106 may comprise an inner layer 106a and an outer layer 106b, as discussed above and shown in phantom in FIG. 6. The edge's of the outer layer 106b may be bonded directly to the insulative material 104, to contain the inner layer 106a between the outer layer and the insulative material, as above. In that case, the inner layer 106a would be blocked from view in FIG. 6 by the outer layer 106b.

The insulative layer 104 and the polymeric shape memory layer 106 may each be formed as flat layers to form a panel, or have other shapes, depending on the surface of the object 102 that the shape memory insulator 100 is to be attached to. In one example, the shape memory insulator 100 may be placed along the bottom surface of a serving tray, to protect a surface upon which the serving tray is to be placed, such as a table or a person's lap, for example. The heat insulation and the comfort provided by the shape memory insulator would be useful if the tray is placed on a user's legs when they are in bed, for example. The shape memory insulator 100 may also be attached to electronic devices, including hand held electronic devices, for insulation and/or to improve the comfort and control of the device when held by a user. The shape memory insulator 100 or the layer of insulative material 104 may be configured to be attached to an object. For example, either could include holes for screws or recesses for clamps (not shown). The exposed surface of the insulative material 104 may also be glued to a surface of the object 102. If placed adjacent a surface of an electronic device, such as a laptop computer or a handheld electronic device, through holes may be provided for air circulation.

One of ordinary skill in the art will recognize that changes may be made to the embodiments described herein without departing from the spirit and scope of the invention, which is defined by the following claims.

I claim:

1. A method of making a handle, comprising:
   forming a first, insulative layer;
   bonding a second outer layer to at least a portion of the first insulative layer, the second outer layer comprising a first, inner layer of elastomeric material and a second, outer layer of elastomeric material, the outer layer having a hardness greater than a hardness of the inner layer; and
   securing an elongated member to the first, insulative layer, the elongated member having a first end configured to be attached to an object.

2. The method of claim 1, wherein the:
   bonding of the second outer layer to the first, insulative layer is done by a chemical and/or mechanical bond.

3. The method of claim 1, wherein the second outer layer comprises a silicone based elastomeric material, wherein the:
   bonding of the silicone based elastomeric material to the first, insulative layer is done by overmolding.

4. The method of claim 1 further comprising:
overbonding the inner layer of elastomeric material to the first, insulative layer; and
overbonding the outer layer of elastomeric material to the first, insulative layer.

5. The method of claim 4, comprising:
bonding the first, inner layer of elastomeric material to the first, insulative layer by multistep injection molding.

6. The method of claim 1, comprising:
forming the first, insulative layer by extrusion.

7. Cookware comprising:
a body portion to contain or support an item to be heated; and
a handle comprising:
a first inner layer of polymeric insulative material;
a second layer of elastomeric material bonded to at least a portion of the first layer, the elastomeric material comprising a first, inner layer of elastomeric material adjacent to the first layer of polymeric insulative material, a second, outer layer of elastomeric material adjacent to the first, inner layer of elastomeric material, the second outer layer being bonded to the first layer of polymeric insulative material and having a hardness greater than a hardness of the first, inner layer of elastomeric material, to container the first, inner layer of elastomeric material between the first layer of polymeric insulative material and the second, outer layer of elastomeric material
the first, inner layer and/or the second, outer layer of elastomeric material having shape memory such that, when a force is applied to the second layer by a user's hand, the elastomeric material conforms to the user's hand, and when the force is removed, the elastomeric material returns to its shape prior to the force being applied; and
an elongated member secured to the first layer of polymeric insulative material, the elongated member having an end attached to the body portion.

8. The cookware of claim 7, wherein the first, inner layer and the second, outer layer of elastomeric material have shape memory.

9. The cookware of claim 7, wherein the body portion is a pot or a pan.

10. A shape memory insulator comprising: a first layer of polymeric insulative material; and a second layer of elastomeric material bonded to the insulative layer comprising a first, inner layer of elastomeric material adjacent to the first layer of polymeric insulative material, and a second, outer layer of elastomeric material adjacent to the first, inner layer of elastomeric material, the second outer layer being bonded to the first layer of polymeric insulative material and having a hardness greater than a hardness of the first, inner layer of elastomeric material, to contain the first, inner layer of elastomeric material between the first layer of polymeric insulative material and the second, outer layer of elastomeric material, wherein the first inner layer and/or the second, outer layer of elastomeric material have shape memory.

11. The shape memory insulator of claim 10, wherein the first insulative layer comprises acrylonitrile butadiene styrene resin, nylon, or thermoplastic rubber.

12. The shape memory insulator of claim 11, wherein the second layer of elastomeric material comprises at least one of a silicone based elastomeric material.

* * * * *